(12) United States Patent
Khen et al.

(10) Patent No.: US 9,599,490 B2
(45) Date of Patent: Mar. 21, 2017

(54) REDUCED AIRBORNE CONTAMINATION DETECTOR HEADS

(71) Applicant: General Electric Company, Schenectady, NY (US)

(72) Inventors: Roee Khen, Tirat Carmel (IL); Jean-Paul Bouhnik, Tirat Carmel (IL); Yaron Hefetz, Tirat Carmel (IL)

(73) Assignee: General Electric Company, Schenectady, NY (US)

( * ) Notice: Subject to any disclaimer, the term of this patent is extended or adjusted under 35 U.S.C. 154(b) by 164 days.

(21) Appl. No.: 14/671,039

(22) Filed: Mar. 27, 2015

(65) Prior Publication Data

US 2016/0282152 A1 Sep. 29, 2016

(51) Int. Cl.
| | | |
|---|---|---|
| *G01J 1/00* | (2006.01) | |
| *G01D 11/24* | (2006.01) | |
| *G01T 7/00* | (2006.01) | |
| *G01T 1/20* | (2006.01) | |
| *G01T 1/166* | (2006.01) | |

(52) U.S. Cl.
CPC .......... *G01D 11/245* (2013.01); *G01T 1/166* (2013.01); *G01T 1/20* (2013.01); *G01T 7/00* (2013.01)

(58) Field of Classification Search
CPC .......... G01T 1/20; G01T 1/292; G01T 1/166
USPC .......... 250/336.1, 383.02, 336.03, 366, 388
See application file for complete search history.

(56) References Cited

U.S. PATENT DOCUMENTS

2014/0187923 A1* 7/2014 Heukensfeldt Jansen et al. .................. A61B 6/44
600/425
2015/0065873 A1 3/2015 Tsukerman et al.

OTHER PUBLICATIONS

Siegfried L. Stockinger, P.E., Nuclear Power Plant Gaseous Waste Treatment System Design, Prepared for the American Society of Mechanical Engineers—Radioactive Waste Systems Committe—Copyright 2012 (55 pages).
Bolmsjö MS, Persson BR., Factors affecting the trapping performance of xenon holdup—filters in nuclear medicine applications; http://www.ncbi.nlm.nih.gov/pubmed/7078534; Jan. 1982, (1 page).
Pulmonex II Xenon System: http://www.biodex.com/nuclear-medicine/products/lung-ventilation-systems/pulmonex-ii-xenon-system.

* cited by examiner

*Primary Examiner* — David Porta
*Assistant Examiner* — Meenakshi Sahu
(74) *Attorney, Agent, or Firm* — Dean D. Small; The Small Patent Law Group, LLC.

(57) ABSTRACT

A radiation detector head assembly is provided that includes a detector housing and a rotor assembly. The detector housing defines a cavity therein. The rotor assembly includes a detector unit, a body, and a sealing member. The body defines an opening oriented in the imaging direction. The body is disposed at a distance from the detector housing within the cavity defining a passageway extending axially along the body. The sealing member includes a body extending across the opening. The sealing member is coupled to at least one of the shielding unit or the collimator, and is mounted within the cavity to provide a gas-tight seal along the imaging direction between the passageway and the detector unit.

20 Claims, 5 Drawing Sheets

REDUCED AIRBORNE CONTAMINATION DETECTOR HEADS

BACKGROUND

The subject matter disclosed herein relates generally to medical imaging systems, and more particularly to reduction of airborne radiation contamination for detector heads.

In nuclear medicine (NM) imaging, such as single photon emission computed tomography (SPECT) or positron emission tomography (PET) imaging, radiopharmaceuticals may be administered internally to a patient. Detectors (e.g., gamma cameras), typically installed on a gantry, capture the radiation emitted by the radiopharmaceuticals and this information is used, by a computer, to form images. The NM images primarily show physiological function of, for example, the patient or a portion of the patient being imaged. Detectors, however, may be subject to contamination from airborne radiation, such as a radiopharmaceutical that has been inhaled by a patient for imaging one or more aspects of the lungs and subsequently exhaled. Such contamination from airborne radiation negatively affects image quality, and may require re-imaging of the patient. The contamination degrades the performance of NM cameras as it may enter into the collimator and then have a profound effect on the detector, for example.

BRIEF DESCRIPTION

In accordance with an embodiment, a radiation detector head assembly is provided that includes a detector housing and a rotor assembly. The detector housing defines a cavity therein. The rotor assembly is disposed within the detector housing and configured to be rotated about an axis. The rotor assembly includes a detector unit, a body (e.g., a radiation shielding unit), and a sealing member. The detector unit includes an absorption member and associated processing circuitry. The body is disposed within the detector housing and partially surrounds the detector unit. The body defines an opening oriented in an imaging direction. The body is disposed at a distance from the detector housing within the cavity defining a passageway extending axially along the body. The sealing member includes a body extending across the opening. The sealing member is coupled to at least one of the shielding unit or a collimator, and is mounted within the cavity to provide a gas-tight seal along the imaging direction between the passageway and the detector unit.

In accordance with another embodiment, a radiation detector head assembly is provided that includes a detector housing, a rotor assembly, and a heat exchange unit. The detector housing defines a first cavity and a second cavity therein. The first cavity is enclosed from fluid communication with an atmosphere surrounding the exterior of the radiation detector head assembly, and the second cavity is disposed adjacent the first cavity along an interface. The second cavity is in fluid communication with the atmosphere surrounding the exterior of the radiation detector head assembly. The rotor assembly is disposed within the first cavity of the detector housing and is configured to rotate within the first cavity about an axis. The rotor assembly includes a detector unit, and a body. The detector unit includes an absorption member and associated processing circuitry. The body partially surrounds the detector unit, and defines an opening oriented in the imaging direction. The body is disposed at a distance from the detector housing within the first cavity defining a passageway extending axially along the body. The heat exchange unit is disposed along the interface between the first and second cavities.

In accordance with another embodiment, a radiation detector head assembly is provided that includes a detector housing, a rotor assembly, a rotor assembly, and an air circulation unit. The detector housing defines a first cavity therein. The rotor assembly is disposed within the first cavity of the detector housing, and is configured to rotate within the first cavity about an axis. The rotor assembly includes a detector unit, and a body. The detector unit includes an absorption member and associated processing circuitry. The body partially surrounds the detector unit and defines an opening oriented in the imaging direction. The body is disposed at a distance from the detector housing within the first cavity and defines a passageway therebetween extending axially along the body. The radiation shielding unit includes fins disposed on an exterior surface of the rotor assembly and oriented in a transverse direction relative to the axis. The air circulation unit is disposed within the first cavity and is configured to provide an airflow over the fins at least partially in the transverse direction.

DETAILED DESCRIPTION

The foregoing summary, as well as the following detailed description of certain embodiments and claims, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide detector head assemblies that are sealed or protected against radioactive gas or aerosol from a surrounding environment. For example, radioactive gas or aerosol may enter a detector head with a stream of cooling air forced into the detector head by a cooling fan. Even a relatively small amount of such contamination may cause a high count rate, for example due to proximity to a detector. Such contamination may be hard to remove and may remain until the radioactivity decays naturally, a process that may take up to a few days (depending on the half-life of the isotope). Contamination with a shield, for example inside the bores of a collimator, or near a detector crystal, may cause false counts and cause reduction in image quality. It may be noted that in various embodiments the collimator is constructed to pass only a small fraction of the incoming Gamma rays, for example 1 in 10,000. Thus, even a small amount of radioactive source between the collimator and the detector may cause exposure of the detector to radiation flux large enough to create artifacts in the detected image.

In various embodiments, a thin sheet or plate (e.g., plastic) may be placed on a collimator, sealing the collimator bores and preventing contamination of the bores by airborne radioactive contaminants. The thickness and composition of the sheet in various embodiments is selected such that the sheet will cause only small or negligible attenuation of the incoming Gamma rays, yet the sheet will be impervious to gas and aerosol. In some embodiments, a cooling airflow may be directed solely or principally over heat sink fins, to avoid direction of the airflow (which may include airborne radioactive contaminants) over or near the collimator. For example, the fins may be covered with a guide or cover, to create an air conduit. Air from a fan may be directed into the conduit, with air exiting the conduit directed out of the detector head cover. In some embodiments, a heat exchanger (e.g., utilizing closed-loop cooling) may be used to help keep cooling air clean or free of radioactive contaminants. For example, cooling air in contact with a detector may be circulated by a fan such that spent air returns within a detector head cover, with an outside air source used to cool the air circulated and contained within the detector head cover. In some embodiments, a thermoelectric cooling device (e.g., utilizing the Peltier effect). In some embodiments, the temperature within the detector head may be lowered below room temperature, in some embodiments the temperature may be maintained at or near room temperature, and in some embodiments, the temperature may be maintained at a stable temperature that is above room temperature.

A technical effect of at least one embodiment includes improved image quality (e.g., due to reduced confounding effects of airborne radiation). A technical effect of at least one embodiment includes reduction of airborne radiation entering a detector head assembly or components thereof, such as a collimator. A technical effect of at least one embodiment includes improved detector performance (e.g., due to reduced temperature of an operating environment within a rotor assembly). A technical effect of at least one embodiment includes reduction in the number of re-scans performed to replace scans negatively affected by airborne radiation contamination.

Figure 1:
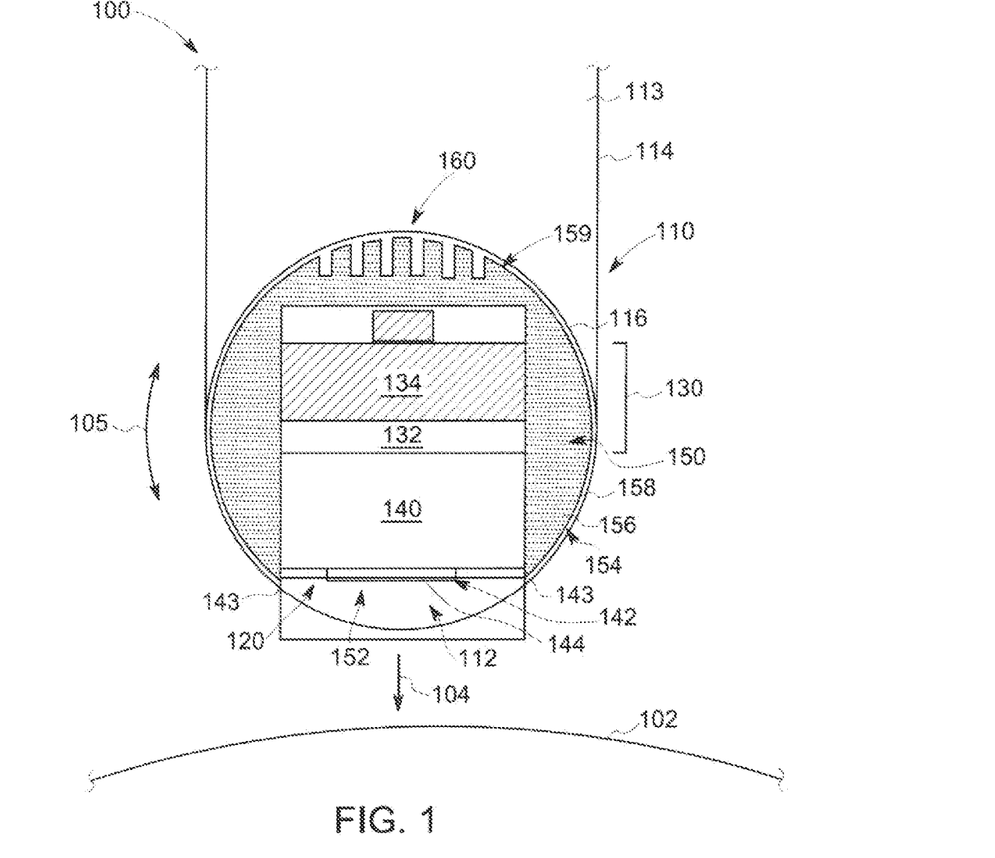
FIG. 1 provides a schematic sectional view of a radiation detector head assembly according to an embodiment.
Figure 2:
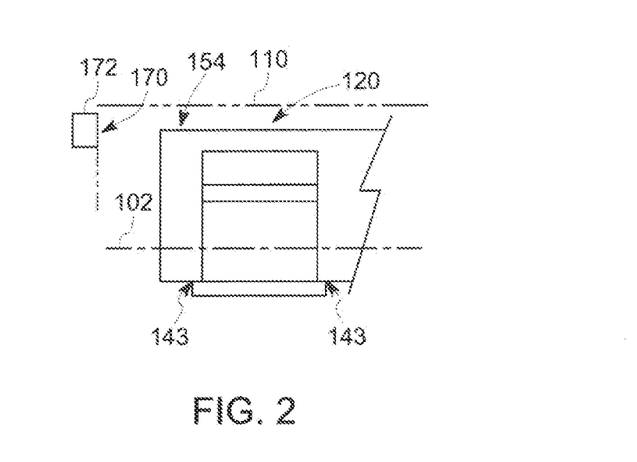
FIG. 2 provides a side view of the radiation detector head assembly of FIG. 1.

FIG. 1 provides a sectional schematic view of a radiation detector head assembly 100 in accordance with various embodiments, and FIG. 2 provides a side view of the radiation detector head assembly 100 with the cover shown in phantom. It may be noted that the radiation detector head assembly 100 may be utilized in connection with medical imaging (e.g., nuclear medicine (NM) imaging, positron emission tomography (PET), single photon emission computed tomography (SPECT), or the like). For example, the radiation detector head assembly 100 may be a portion of an imaging system configured to image an object 102 (or a portion thereof). In the illustrated embodiment, the radiation detector head assembly 100 includes an arm 113 that may adjustably couple the radiation detector head assembly 100 to a gantry (not shown) of an imaging system. It may be noted that, while only one radiation detector head assembly 100 is shown in FIG. 1 for ease and clarity of illustration, multiple independently adjustable or positionable radiation detector head assemblies 100 may be employed in various embodiments. The radiation detector head assemblies may be define smaller individual fields of view that may be combined to provide a larger, combined field of view of an object being imaged. For example, the detector head assembly may be generally cylindrically shaped with a diameter of about 2.5 inches and a length of about 14 inches.

In the illustrated embodiment, the depicted radiation detector head assembly 100 includes a detector housing 110 and a rotor assembly 120. The rotor assembly 120 is disposed within the detector housing 110 and is configured to be rotated in a rotational direction 105 about an axis 102. Rotation of the rotor assembly 120 may be performed to orient a detector with the rotor assembly in a desired orientation with respect to the object 102 being imaged.

As seen in FIG. 1, the depicted detector housing 110 defines a cavity 112 therein, with the rotor assembly 120 disposed within the cavity 112. The depicted detector housing 112 includes a detector cover 116 (within which the cavity 112 is defined) and an arm cover 114 for an arm 113 used to articulate the radiation detector assembly 110 relative to a gantry (not shown) or other structure to which the radiation detector assembly 100 is mounted via the arm 113. All or a portion of the detector housing 110 may be made from a light, strong material that is generally transparent to radiation emitted from an object being imaged, such as carbon fiber. All or a portion of the detector housing 110 may include a metal lining or other structure configured to address, reduce, or eliminate electromagnetic interference (EMI).

In the illustrated embodiment, as best seen in FIG. 1, the rotor assembly 120 includes a detector unit 130, a collimator 140, a body 150, and a sealing member 142. Generally, the detector unit 130 is configured to detect radiation emitted from the object 102 (e.g., a human patient). The collimator 140 is interposed between the detector unit 130 and the object 102, and is configured to control angles at which radiation is allowed to pass to the detector unit 130 from the object 102 in an imaging direction 104. For example, the collimator 140 in some embodiments includes an array of tubes having small diameter holes configured to allow passage of photons only in a generally normal direction to a detector surface of the detector unit 130. The detector unit 130 includes an absorption member 132 and associated processing circuitry 134. Generally, the absorption member 132 is configured to receive radiation passing through the collimator 140 and to generate electronic signals, in conjunction with the processing circuitry 134, in response to radiation received and/or absorbed by the absorption member 132. The absorption member 132 may be formed of a semiconductor material, such as Cadmium Zinc Telluride (CdZnTe), often referred to as CZT, Cadmium Telluride (CdTe), or Silicon (Si), among others. In the illustrated embodiment, the body 150 is configured as and may also be understood as a radiation shielding unit. For example, the body 150 partially surrounds the detector unit 130, and is configured of a material (e.g., Lead or Tungsten, among others) that blocks, limits, inhibits, and/or prevents the passage of radiation emitted from the object 102 therethrough. An opening 152 is defined by the body 150 and generally oriented in the imaging direction 104 allowing the passage of radiation emitted from the object 102 to pass on to the collimator 140 and the detector unit 130. Generally, in the illustrated embodiment, the body 150 acts to block radiation from entering the absorption member 132 from any orientation or direction other than via the collimator 140.

It may be noted that, in use, the processing circuitry 134 may generate an amount of heat that can potentially affect performance of the detector unit 130. Accordingly, air may be directed over the rotor assembly 120 including the detector unit 130 to cool the detector unit 130 and prevent or inhibit loss of performance due to heating of the detector unit 130. In the illustrated embodiment, the body 150 (within which the collimator 140 and detector unit 130 are disposed) is spaced at a distance from an interior surface of the detector housing 110, thereby defining a passageway 154. The passageway 154 extends circumferentially around the rotor assembly 120 (e.g., around the body 150) and also extends axially or along the length of the rotor assembly 120 and body 150. The passageway 154 thus allows for the passage of air (e.g., axially) over the body 150 as well as providing a clearance for rotational movement of the rotor assembly 120 with respect to the detector housing 110. For example, air may be passed over the rotor assembly 120 axially (e.g., in a direction parallel to or along the axis 102) and/or transversely (in a direction transverse to the axis 102 such as clockwise or counterclockwise around a cross-section of the rotor assembly 110).

However, if the air used to cool the detector unit 130 is drawn from the atmosphere surrounding an imaging system and the object 102 being imaged, air borne radiation may enter the space around the absorption unit 132 (e.g., in or near the collimator 140), confounding the detection of radiation emitted from the object 102. A relatively small amount of airborne radiation may overwhelm the radiation emitted from the object 102, resulting in unusable images and/or requiring a subsequent imaging. Further, airborne radiation trapped in a radiation detector head assembly may render the detector head assembly useless until the airborne radiation source sufficiently decays, which may take days or hours. Airborne radiation that enters the small bores of a collimator may be particularly troublesome, due to both proximity to the absorption unit 132 as well as difficulty of removal from the airborne radiation from the collimator tubes.

Airborne radiation may result, for example, from certain scans of the lungs of a patient. For example, a radiopharmaceutical may be introduced via an inhaled gas or aerosol into the lungs of a patient for imaging one or more aspects of the lungs of the patient. When the patient exhales, the radiopharmaceutical previously inhaled by the patient may be exhaled into the atmosphere surrounding the patient and the imaging system. While the radiopharmaceutical absorbed by the lungs results in photons emitted from the lungs that may be used to image the lungs, the airborne radiation provides a confounding or contaminating source of radiation that does not provide information on the anatomy of interest (e.g., the lungs or aspect thereof). Moreover, where the imaging equipment is used for more than one patient, the airborne radiation may remain in the atmosphere, confounding or contaminating imaging processes for subsequent patients.

In the illustrated embodiment, the sealing member 142 reduces, prevents, inhibits, and/or eliminates the introduction of airborne radiation (in contrast to radiation emitted from the object 102) into the collimator 140, reducing the amount of airborne radiation that may reach into the collimator 140 or otherwise near the detector unit 130, as well as improving the ease of removal of airborne radiation from the radiation detector head assembly 110 (e.g., airborne radiation in the passageway 154 may be more easily removed by a passing airflow than airborne radiation in collimator tubes). Accordingly, image quality is improved and/or the number of re-scans required by confounding or contamination is reduced or eliminated.

The depicted sealing member 142 includes a sealing member body 144 that extends across the opening 152. The sealing member 142 (e.g., the sealing member body 144 of the sealing member) in the illustrated embodiment is mounted, joined, or otherwise coupled to the body 150 at locations around the perimeter of the opening 152. The sealing member 142 is mounted within the cavity 112 to provide a gas-tight seal along the imaging direction 104 between the passageway 154 and the collimator 140 (and detector unit 130). For example, the sealing member 142 may be welded to the body 150 or otherwise joined with an airtight fit, for example by use of a sealant configured to inhibit the passage of air at the junction of the sealing member 142 and the body 150. The sealing member 142 accordingly prevents or inhibits the passage of airborne radiation from an atmosphere surrounding the radiation detector head assembly 110 to the collimator 140 and the detector unit 130 (e.g., via the passageway 154). As seen in FIGS. 1 and 2, the sealing member 142 is joined via joints 143 that extend along the perimeter of the body 144. The joints 143 may represent or correspond to a sealant, a seal such as an O-ring, a weld, or other interface between the body 144 and the body 150 that prevents or inhibits the passage of air.

In the embodiment depicted in FIG. 1, the body 144 is flat or planar, and may be mounted to the body 150 via one or more of a sealant, adhesive, or welding for example, to provide for sealing against the passage of airborne radiation into the opening 152. The body 144 may be formed from a material that is generally transparent to radiation, so that the body 144 inhibits or prevents the passage of air carrying airborne radiation into the opening 152 or collimator 140, while still allowing photons emitted from the object 102 to pass to the absorption unit 132 for use in imaging. For example, the body 144 may be formed from Aluminum. In other embodiments, the body 144 may mount directly to the collimator 140, for example as a wrapping that surrounds at least a portion of the collimator 140 including tube openings of the collimator 140.

As discussed herein, the body 150 partially surrounds the detector unit 130, and includes the opening 152 to allow the passage of radiation emitted from the object 102 to pass on to the collimator 140 and the detector unit 130. Generally, the body 150 acts to block radiation from entering the absorption member 132 from any orientation or direction other than via the collimator 140. In the illustrated embodiment, the body 150 comprises a shielding member 156 that is surrounded by a casing 158. For example, the shielding member 156 may be formed of a radiation blocking material such as Lead or Tungsten, while the casing 158 may be formed of a heat conducting material such as Aluminum. Aluminum provides for conduction of heat away from the center of the rotor assembly 110 and heat exchange with cooling air passing through the passageway 154, while also being relatively lightweight and providing sufficient structural strength for the rotor assembly 120 to maintain its shape during rotation. In some embodiments, the casing 158 may be formed from an extrusion, with the shielding member 156 added inside the extrusion (e.g., poured into the extrusion in a liquid or molten shape and allowed to solidify). In the illustrated embodiment, the casing 158 completely surrounds the shielding member 156, with the shielding member completely contained within an interior of the casing 158.

In the embodiment depicted in FIG. 1, the casing 158 of the body 150 includes fins 160 formed along an exterior surface 159 of the casing. The fins 160 may extend along all of the length of the body 150 or a portion thereof. The fins 160 define openings extending into the body 150, allowing for increased surface area for improved heat exchange between the casing 158 and a cooling air flow while still allowing a generally circular cross-section for the rotor assembly 120 for interference free rotation within the detector housing 110 without requiring an overly large gap between the rotor assembly 120 and the detector housing 110. In the embodiment depicted in FIG. 1, the fins 160 extend axially along an exterior of the rotor assembly 110, with the depicted fins 160 extending axially along the exterior surface 159 of the casing 158. The axial orientation shown in FIG. 1 provides for improved heat exchange with an air flow passing axially or lengthwise over the length of the rotor assembly 110. The fins 160 are disposed opposite the opening 152, providing for passage of the cooling air flow at a location on the opposite side of the rotor assembly 110, allowing for the cooling air to be routed where it will not pass over or near the opening 152, reducing the risk of contamination of the collimator 140 and/or confounding of imaging information acquired by the detector unit 130.

Figure 3:
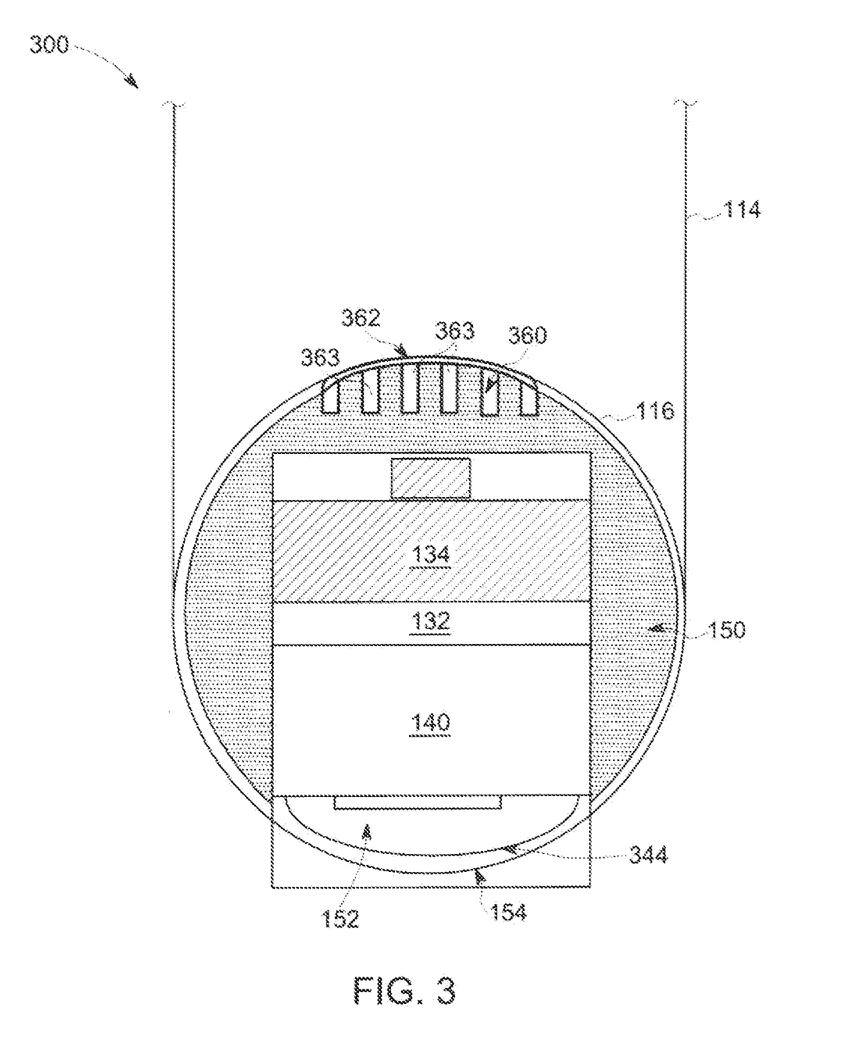
FIG. 3 provides a schematic sectional view of a radiation detector head assembly according to an embodiment.

Further, in some embodiments, an additional guide may be employed to help contain the cooling air flow within a region proximate the fins and away from the opening 152. For example, FIG. 3 provides a sectional schematic view of a radiation detector head assembly 300 in accordance with various embodiments. The radiation detector head assembly 300 may be generally similar in certain respects to the radiation detector head assembly 100. As seen in FIG. 3, the radiation detector head assembly includes fins 360 that may be generally similar to the fins 160. However, the radiation detector head assembly 300 also includes a guide member 362 mounted to an exterior of the rotor assembly 120 and defining one or more passageways 363 between the guide member 362 and the fins 360. The guide member 362 may extend along all of the length of the radiation shielding unit or a portion thereof. The guide member 362 directs a cooling airflow over the fins 360 and inhibits, reduces, or prevents the passage of the airflow over or near the opening 152, thereby reducing the risk of contamination or confounding by airborne radiation. The guide member 362, for example, may include a mouth or duct configured to receive the airflow from an inlet on the exterior of the radiation detector head assembly 300.

In the embodiment depicted in FIG. 1, the body 144 is generally planar and disposed proximate an end of the collimator 140 (and/or the opening 154). Other shapes may be employed for the body in various embodiments. For example, returning to the embodiment depicted in FIG. 3, the radiation detector head assembly 300 includes a body 344 that is configured t conform to an interior shape of the detector housing 110. For example, in the illustrated embodiment, the body 344 has a generally circular exterior so that the body 344 is concave with respect to the opening 152 of the radiation shielding unit. The extension of the body 344 away from the opening 152 and the collimator 140 limits the size of the passageway 154 proximate the opening 152 and the collimator 140 and reduces the available volume for potentially contaminated airborne radiation to accumulate or remain proximate the opening 152 and the collimator 140.

In various embodiments, additionally or alternatively to the use of a sealing member or other techniques disclosed herein, filtration may be employed to help reduce the amount of airborne radiation that enters a cooling flow of atmospheric air introduced into a radiation detector head assembly. For example, as best seen in FIG. 2, the radiation detector head assembly 100 may include an inlet 170 to the passageway 154. Generally the inlet 170 provides a path or interface for fluid communication between the passageway 154 and the atmosphere surrounding the radiation detector head assembly 100. In some embodiments, an inlet 170 may provide an opening through which atmospheric air may pass freely and/or unassisted. In other embodiments, a valve and/or propulsion system (e.g., fan) may be used to control the flow of air through a radiation detector head assembly (e.g., a valve to limit or stop the flow of air, or a fan to increase the flow of air). In the illustrated embodiment, the radiation detector head assembly 100 includes a radiation filter 172 interposed between an atmospheric or other supply source of air and the rotor assembly 120 (e.g., interposed between the source of air and the passageway 154). The radiation filter 172 is configured to remove airborne radiation from an airflow entering the radiation detector head assembly 100 that will be used to remove heat from the rotor assembly 120. For example, the radiation filter 172 may include a charcoal bed.

In some embodiments, the radiation filter 172 may be removably coupled to the inlet, and may be selectively utilized to filter radiation for some imaging scans, and to not be employed for other imaging scans. Thus, the radiation filter 172 may be utilized when appropriate to reduce the risk of contamination by airborne radiation, and not used when not required or desirable, thereby increasing filter lifetime and/or improving airflow when the radiation filter 172 is not in use. For example, when an aerosol or other inhaled nuclear medicine radioactive material is to be inhaled (and consequently exhaled) by a patient, the radiation filter 172 may be selectively utilized. Further, the radiation filter 172 may be selectively utilized for a predetermined amount of time (e.g., remainder of a day, or remainder of a period of hours corresponding to an increased or undesired level of risk of contamination due to exhaled air remaining in an examination room after an examination using an inhaled radioactive material). The amount of time may be determined, for example, based on the quantity of radioactive material inhaled or otherwise administered, the size of the room, and the half-life of the radioactive material. In some embodiments, the radiation filter 172 may be selectively utilized (or not utilized) by attachment to the inlet 170 (or detachment from the inlet 170 when not in use). In some embodiments, the inlet 170 may include a bypass line, such that the inlet has a first branch that passes through the radiation filter 172 and a second branch that does not, with the first branch selected when use of the radiation filter 172 is desired, and the second branch selected when use of the radiation filter 172 is not desired.

Figure 4:
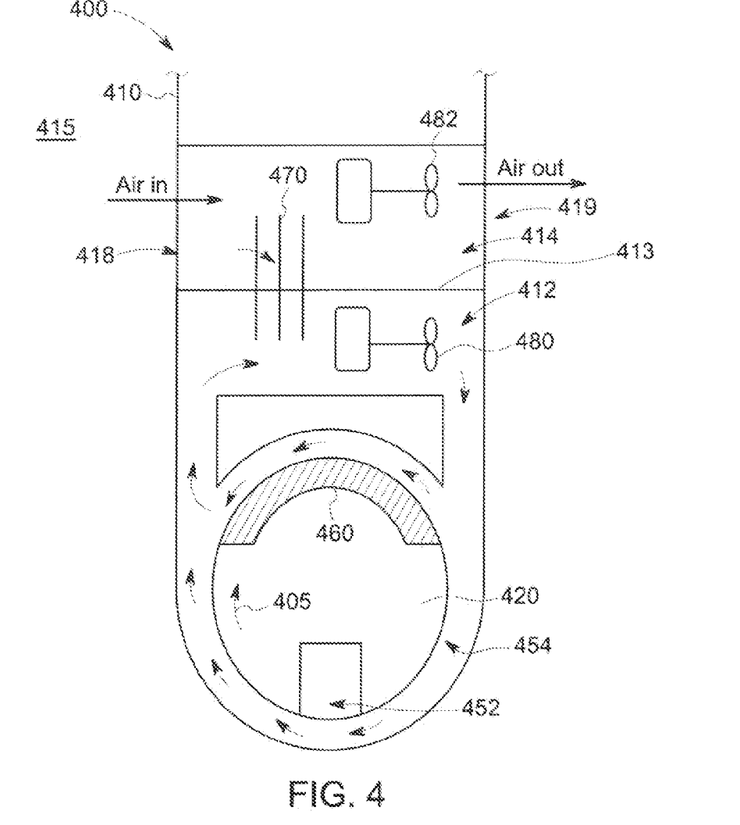
FIG. 4 provides a side schematic sectional view of a radiation detector head assembly according to an embodiment.
Figure 5:
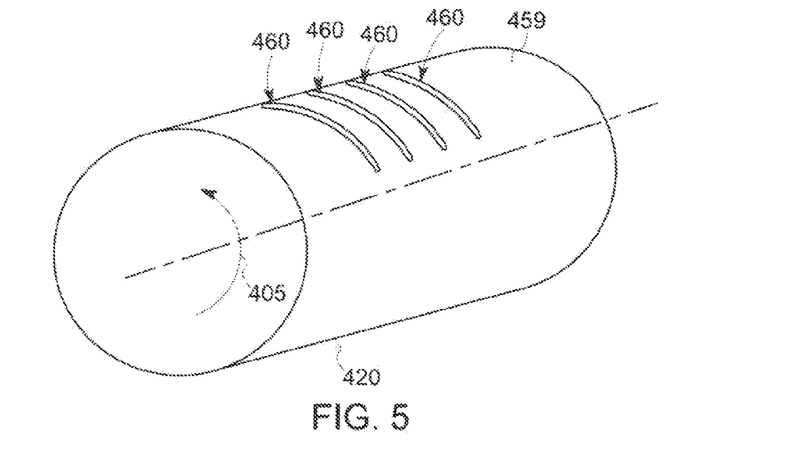
FIG. 5 provides a perspective view of a rotor assembly for the radiation detector head of FIG. 4.

In the embodiment depicted in FIG. 1, a sealing member disposed proximate a collimator and radiation detector is used to help prevent, inhibit, or reduce the effect of airborne radiation on a radiation detector. Additionally or alternatively, in various embodiments, a passageway providing a cooling airflow to a rotor assembly may be enclosed from a surrounding environment. FIG. 4 provides a side schematic sectional view of a radiation detector head assembly 400 formed in accordance with various embodiments, and FIG. 5 provides a perspective view of a rotor assembly for the radiation detector head assembly 400.

In the embodiment depicted in FIG. 4, the radiation detector head assembly 400 includes a detector housing 110, a rotor assembly 420, and a heat exchange unit 470. The rotor assembly 420 is configured to rotate in rotational direction 405 within the detector housing about an axis passing through the center of the rotor assembly 420. The rotor assembly includes a detector unit (not shown in FIG. 4, see FIG. 1 and related discussion), a collimator (not shown in FIG. 4, see FIG. 1 and related discussion), and a radiation shielding unit (not shown in FIG. 4, see FIG. 1 and related discussion) disposed therein, with the radiation shielding unit having an opening 452 through which radiation emitted from an object being imaged (e.g., a human patient) may pass uninhibited by a shielding material of the radiation shielding unit. Further, the rotor assembly 420 (e.g., the radiation shielding unit in which the detector unit and collimator are disposed) is disposed at a distance from the detector housing 110, defining a passageway 454 extending along the length of the rotor assembly 420. The passageway allows for a cooling airflow to pass over the rotor assembly 420, for example to remove heat generated by electronics of the detector unit of the rotor assembly 420. It may be noted that the radiation detector head assembly 400 may include various aspects generally similar to the radiation detector head assembly 100 not depicted and/or discussed in connection with FIG. 4 for improved clarity of illustration. For example, the components of the rotor assembly 420 in various embodiments (e.g., radiation shielding unit, opening, collimator, detector unit) may be generally similar to those discussed in connection with FIG. 1. Further still, additional embodiments are contemplated where various aspects of the embodiments of FIGS. 1 and 4 may be combined together (e.g., a transverse flow and/or orientation of fins in conjunction with various aspects of the radiation detector head assembly 100, an axial flow and/or orientation of fins in conjunction with various aspects of the radiation detector head assembly 400).

As seen in FIG. 4, the detector housing 410 defines a first cavity 412 and a second cavity 414 inside the detector housing 410. The rotor assembly 420 is disposed within the first cavity 412 and configured to rotate within the first cavity 412, with the passageway 454 at least partially defined by a gap between an interior surface of the first cavity 412 and an exterior surface of the rotor assembly 420. The first cavity 412 is disposed adjacent the second cavity 414 along an interface 413. The interface 413 in the illustrated embodiment extends across the length and width of a shared surface of the first cavity 412 and the second cavity 414, and is generally air tight to prevent or inhibit fluid communication between the first cavity 412 and the second cavity 414. Accordingly, the first cavity 412 may be understood as defining a first volume and the second cavity 414 as defining a second volume, with the two volumes segregated from each other. The first cavity 412 is enclosed, and is not in fluid communication with an atmosphere 415 surrounding the exterior of the radiation detector head assembly, thereby preventing airborne radiation from the atmosphere 415 (e.g., airborne radiation exhaled by a patient) from entering the first cavity 412 and/or accumulating or collecting proximate to a collimator and/or detector unit of the rotor assembly 420. Air may circulate within the first cavity 412, for example, as shown by the arrows within the first cavity 412 in FIG. 4.

The second cavity 414 is disposed adjacent the first cavity 412 along the interface, and is in fluid communication with the atmosphere 415 surrounding the exterior of the radiation detector head assembly 400. In the illustrated embodiment, an inlet 418 allows for the passage of air from the atmosphere 415 into the second cavity 414, and an outlet 419 allows for the passage of air from the second cavity 414 to the atmosphere 415. Thus, the second cavity 414 is open to the atmosphere 415, or not enclosed, whereas the first cavity 412 is not open to the atmosphere 415, or is enclosed. It may be noted that the first cavity 412 in various embodiments may have one or more valves and/or selectably closable openings wherein the first cavity 412 may be selectably opened and closed (e.g., for maintenance, repair, replacement of rotor assembly components, for adding air to the first cavity, for venting the first cavity, or the like). Generally, the first cavity 412 is enclosed during imaging of patients utilizing an inhaled nuclear imaging medicine. In the illustrated embodiment, the second cavity 414 is disposed above the first cavity 412 as seen in FIG. 4, or opposite the opening 452. Accordingly, shielding material of the radiation shielding unit is interposed between the second cavity 414 (which may contain airborne radiation) and the detector unit of the rotor assembly 420 unless the rotor assembly 420 is rotated at least more than 90 degrees from the position shown in FIG. 4. The size, shape, and orientation of the opening 452 may be configured to provide additional rotational ranges for which the shielding material remains interposed between the second cavity 414 and the detector unit of the rotor assembly 420. It may be noted that the second cavity 414 provides an example of an air supply external to the first cavity 412.

The depicted heat exchange unit 470 is disposed along the interface 413 between the first cavity 412 and the second cavity 413. The heat exchange unit 470 is configured to provide heat transfer between the first and second cavities. Thus, heat generated by a detector unit of the rotor assembly 420 may be transferred to air within the volume of the first cavity 412. Heat from the air in the first cavity 412 may be transferred to the second cavity 414 via the heat exchange unit 470, and the heat from the second cavity 414 may be dispersed to the atmosphere 415 (e.g., heated air from the second cavity 414 may be passed to the atmosphere 415 because the second cavity 414 is not enclosed). Accordingly, heat from the rotor assembly 420 may be removed from the first cavity 412 and dispersed to the atmosphere 415 while maintaining the rotor assembly 420 in an enclosed volume to prevent or reduce access to the rotor assembly 420 by airborne contamination. The heat exchange unit 470 may include one or more of a variety of structures and/or devices. For example, the heat exchange unit 470 may include fins distributed over a portion of a surface of the interface 413. It may be noted that the interface 413 may be formed of a thermally conductive material. Additionally or alternatively, the heat exchange unit 470 may include a heat exchanger utilizing a circulating cooling fluid, for example, a shell-and-tube heat exchanger. In some embodiments, the heat exchange unit 470 may include a thermoelectric cooler (TEC). Use of a TEC, for example, may allow for use of a cooling temperature that is below room temperature for further improvement or enhancement of detector performance. Additionally, use of a cooling temperature that is below room temperature may reduce the risk or amount of condensation in or near electronics within the rotor assembly 420.

The rotor assembly 420 may include fins to improve heat transfer from the rotor assembly 420 to the air in the volume defined by the first cavity 412. In the illustrated embodiment, as best seen in FIG. 5, the rotor assembly 420 includes fins 460 disposed on and/or formed in an exterior surface 459 of the rotor assembly 420. For example, the fins 460 may be formed on an exterior surface of a casing of a radiation shielding unit, similar to the fins 160. In the radiation detector head assembly 400 depicted in FIGS. 4 and 5, however, the fins 460 are oriented in a transverse direction that is normal or perpendicular to the axis about which the rotor assembly 420 rotates. For example, the fins 460 shown in FIG. 5 extend circumferentially about the exterior of the rotor assembly 420.

Further, as best seen in FIG. 4, the depicted radiation detector head assembly 400 includes a first air circulation unit 480 disposed with the first cavity 412. The first air circulation unit 480 is configured to provide an airflow over the fins 460 at least partially in the transverse direction (e.g., a direction along or tangent to the cross-section of the rotor assembly). Accordingly, the first air circulation unit 480 directs air in the first cavity 412 over the fins 460 and around the rotor assembly 420. The first air circulation unit 480 may include one or more fans mounted within the first cavity 412. The first air circulation unit 480 provides for improved or increased heat transfer from the rotor assembly 420.

In the illustrated embodiment, the radiation detector head assembly 400 also includes a second air circulation unit 482. The second air circulation unit 482 is disposed within the second cavity 414 and is configured to provide an atmospheric air flow through the second cavity 414. For example, the second air circulation unit 482 may improve or increase the amount of air passing into the second cavity 412 via the inlet 418 and out of the outlet 419. Accordingly, the second air circulation unit 482 helps provide improved heat transfer from the radiation detector head assembly 400 to the atmosphere 415. It may be noted that in the illustrated embodiment, the first air circulation unit 480 and the second air circulation unit 482 are both oriented to direct air in a direction that is transverse to the axis about which the rotor assembly 420 rotates; however, other arrangements may be utilized in various embodiments. For example, the first air circulation unit 480 may be oriented as shown, but the second air circulation unit may be rotated 90 degrees and configured to direct air in the second cavity 414 axially along the length of the radiation detector head assembly 400. As another example, the second cavity 414 may be omitted, and the first cavity 412 may not be enclosed from the environment, but instead one or more radiation filters may be interposed between the first cavity and the atmosphere, allowing heat to be transferred directly from the rotor assembly 420 to the atmosphere 415 while still addressing or reducing the risk of airborne radiation contamination. As another example, while the inlet and outlet of the second cavity 414 are shown on opposite sides of the radiation detector head assembly, the inlet and outlet may be otherwise located, with ducting used to route air between the interior of the second cavity 414 and the inlet and outlet.

Figure 6:
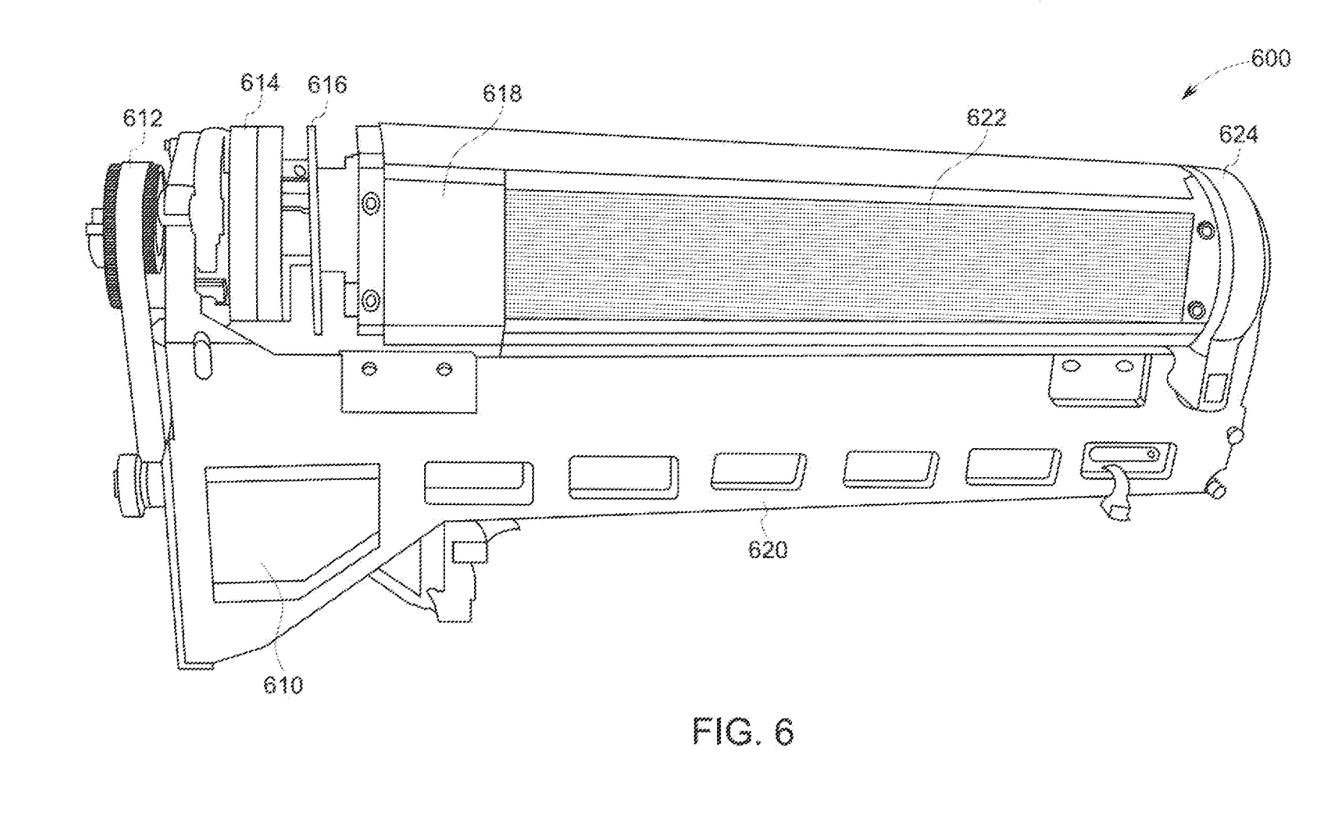
FIG. 6 provides a side view of a radiation detector head assembly according to an embodiment.

As discussed herein, a radiation detector head assembly may include a rotor assembly configured to rotate relative to a housing in which the rotor assembly is disposed. FIG. 6 shows a side view of radiation detector head assembly 600, including a motor for rotating the rotor assembly within the housing, which may also be referred to as pivoting the radiation detector head assembly, formed in accordance with various embodiments. As seen in FIG. 6, the depicted radiation detector head assembly 600 includes a motor 610, a pivot belt 612, a slip-ring 614, electronics module 616, a rotor 618, a stator 620, a collimator 622, and an air duct 624. A cover or housing for the radiation detector head assembly 600 has been removed for improved clarity and ease of illustration.

The motor 610 (e.g., an electric motor) may be controlled by a processing unit of an imaging system to rotate the rotor 618 (which may include one or more aspects of rotor assemblies discussed herein). The motor 610 is mounted to the stator 620, and is coupled to the rotor 618 via the pivot belt 612. The slip-ring 614 allows for electrical communication between the electronics module 616 (which rotates with the rotor 618) and electronics mounted to the stator 620 or other structure that does not rotate with the rotor 618. In some embodiments, the rotor 618 may rotate over a range of, for example, about 210 degrees to provide flexibility in orienting a detector of the radiation detector head assembly 600. The air duct 624 is in fluid communication with a passageway surrounding at least a portion of the rotor 618 to provide for heat removal from the rotor 618 using air from an atmosphere surrounding an imaging system including the radiation detector head assembly 600 and object being imaged. Additional discussion regarding example system including radiation detector head assemblies may be found in U.S. patent application Ser. No. 14/016,939, filed Sep. 3, 2013, entitled "Methods And Systems For Controlling Movement Of Detectors Having Multiple Detector Heads," which is hereby incorporated by reference in its entirety.

Figure 7:
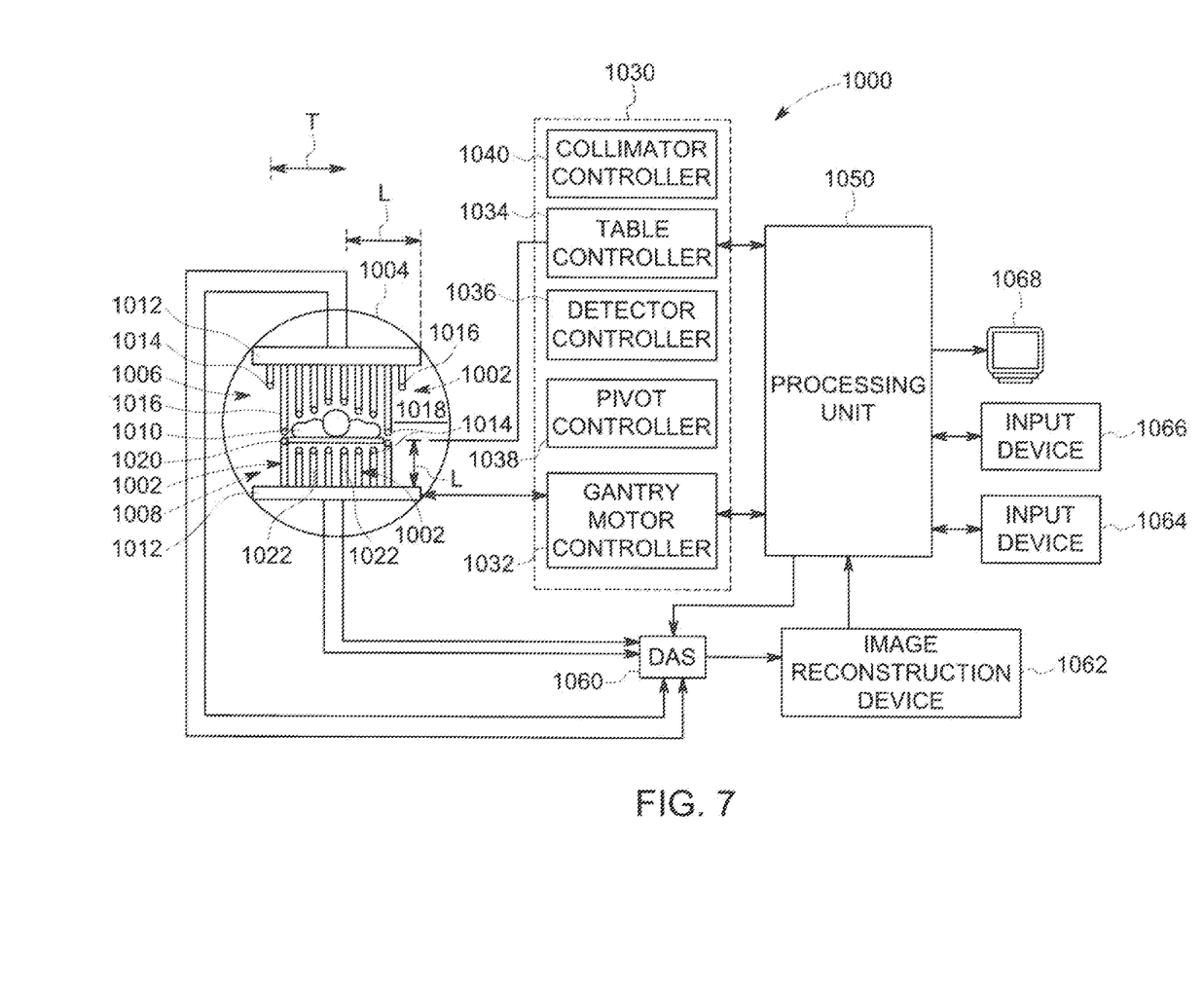
FIG. 7 shows a schematic view of an imaging system, according to an embodiment.

The embodiments described above and illustrated by FIGS. 1-6 may be implemented in medical imaging systems, such as, for example, SPECT, SPECT-CT, PET and PET-CT. Various methods and/or systems (and/or aspects thereof)

described herein may be implemented using a medical imaging system. For example, FIG. 7 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). It should be noted that the arrangement of FIG. 7 is provided by way of example for illustrative purposes, and that other arrangements (e.g., detector arrangements) may be employed in various embodiments. In the illustrated example, a plurality of imaging detectors 1002 are mounted to a gantry 1004. In the illustrated embodiment, the imaging detectors 1002 are configured as two separate detector arrays 1006 and 1008 coupled to the gantry 1004 above and below a subject 1010 (e.g., a patient), as viewed in FIG. 7. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 7). Additionally, each of the imaging detectors 1002 includes a detector unit 1014, at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels (pixelated anodes). In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

The collimators 1022 (and detectors) in FIG. 7 are depicted for ease of illustration as single collimators in each detector head. Optionally, for embodiments employing one or more parallel-hole collimators, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022. In some embodiments, detectors 1002 and collimators 1022 may swivel or rotate around an axis.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 7 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

It should be noted that the particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

As used herein, the term "computer," "processor," or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer," "processor," or "module."

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" may include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radiation detector head assembly, the radiation detector head assembly comprising:
    a detector housing defining a cavity therein;
    a rotor assembly disposed within the detector housing and configured to be rotated about an axis, the rotor assembly comprising
        a detector unit comprising an absorption member and associated processing circuitry;
        a body disposed within the detector housing and partially surrounding the detector unit, the body defining an opening oriented in an imaging direction, the body disposed at a distance from the detector housing within the cavity defining a passageway extending axially along the body; and
        a sealing member comprising a sealing member body extending across the opening, the sealing member coupled to at least one of the body or a collimator disposed within the cavity proximate the detector unit, the sealing member mounted within the cavity to provide a gas-tight seal along the imaging direction between the passageway and the detector unit.

2. The radiation detector head assembly of claim 1, wherein the body comprises a radiation shielding unit including a casing surrounding a shielding member.

3. The radiation detector head assembly of claim 2, further comprising fins disposed along an exterior surface of the casing opposite the opening.

4. The radiation detector head assembly of claim 3, further comprising a guide member mounted above the fins and configured to direct flow along the fins and inhibit flow elsewhere.

5. The radiation detector head assembly of claim 1, wherein the sealing member body is configured to conform to an interior shape of the detector housing.

6. The radiation detector head assembly of claim 1, further comprising an inlet to the passageway and a radiation filter, the radiation filter configured to be coupled to the inlet.

7. The radiation detector head assembly of claim 6, wherein the radiation filter is configured to be removably coupled to the inlet.

8. A radiation detector head assembly comprising:
- a detector housing defining a first cavity and a second cavity therein, the first cavity enclosed from fluid communication with an atmosphere surrounding the exterior of the radiation detector head assembly, the second cavity disposed adjacent the first cavity along an interface and in fluid communication with the atmosphere surrounding the exterior of the radiation detector head assembly;
- a rotor assembly disposed within the first cavity of the detector housing and configured to rotate within the first cavity about an axis, the rotor assembly comprising
  - a detector unit comprising an absorption member and associated processing circuitry;
  - a body partially surrounding the detector unit, the body defining an opening oriented in the imaging direction, the body disposed at a distance from the detector housing within the first cavity defining a passageway extending axially along the body; and
- a heat exchange unit disposed along the interface between the first and second cavities.

9. The radiation detector head assembly of claim 8, wherein the body comprises a radiation shielding unit comprising fins disposed on an exterior surface of the rotor assembly, the fins oriented in a transverse direction relative to the axis.

10. The radiation detector head assembly of claim 9, further comprising a first air circulation unit disposed within the first cavity and configured to provide an airflow over the fins at least partially in the transverse direction.

11. The radiation detector head assembly of claim 10, further comprising a second air circulation unit disposed in the second cavity and configured to provide an atmospheric air flow through the second cavity.

12. The radiation detector head assembly of claim 8, further comprising a first air circulation unit disposed within the first cavity and configured to provide an airflow over the rotor assembly, and a second air circulation unit disposed in the second cavity and configured to provide an atmospheric air flow through the second cavity.

13. The radiation detector head assembly of claim 8, wherein the heat exchange unit comprises a circulating heat exchanger.

14. The radiation detector head assembly of claim 8, wherein the heat exchange unit comprises a thermoelectric cooler (TEC).

15. A radiation detector head assembly comprising:
- a detector housing defining a first cavity therein;
- a rotor assembly disposed within the first cavity of the detector housing and configured to rotate within the first cavity about an axis, the rotor assembly comprising
  - a detector unit comprising an absorption member and associated processing circuitry;
  - a body partially surrounding the detector unit, the body defining an opening oriented in the imaging direction, the radiation shielding unit disposed at a distance from the detector housing within the first cavity defining a passageway extending axially along the body, the body comprising fins disposed on an exterior surface of the rotor assembly and oriented in a transverse direction relative to the axis; and
- an air circulation unit disposed within the first cavity configured to provide an airflow over the fins at least partially in the transverse direction.

16. The radiation detector assembly of claim 15, wherein the body comprises a radiation shielding unit including a casing surrounding a shielding member, wherein the fins are disposed on the casing opposite the opening.

17. The radiation detector head assembly of claim 15, further comprising an inlet to the passageway and a radiation filter, the radiation filter configured to be coupled to the inlet.

18. The radiation detector head assembly of claim 17, wherein the radiation filter is configured to be removably coupled to the inlet.

19. The radiation detector head assembly of claim 15, wherein the first cavity is enclosed from fluid communication with an atmosphere surrounding the exterior of the radiation detector head assembly.

20. The radiation detector head assembly of claim 19, further comprising a heat exchange unit operably coupled to an interface between the first cavity and an air supply external to the first cavity.

* * * * *